United States Patent
Eriksson et al.

(10) Patent No.: US 9,118,532 B2
(45) Date of Patent: Aug. 25, 2015

(54) METHOD AND ARRANGEMENT IN A TELECOMMUNICATIONS SYSTEM

(75) Inventors: Erik Eriksson, Linkoping (SE); George Joengren, Sundbyberg (SE); Yin Liu, Beijing (CN); Jessica Oestergaard, Stockholm (SE); Yu Qian, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 188 days.

(21) Appl. No.: 13/574,699

(22) PCT Filed: Feb. 10, 2010

(86) PCT No.: PCT/CN2010/070619
§ 371 (c)(1),
(2), (4) Date: Sep. 12, 2012

(87) PCT Pub. No.: WO2011/097796
PCT Pub. Date: Aug. 18, 2011

(65) Prior Publication Data
US 2012/0327874 A1   Dec. 27, 2012

(51) Int. Cl.
*H04W 24/10* (2009.01)
*H04L 27/26* (2006.01)
*H04L 5/00* (2006.01)
*H04L 25/03* (2006.01)
*H04B 17/24* (2015.01)
*H04B 17/382* (2015.01)

(52) U.S. Cl.
CPC .......... *H04L 27/2647* (2013.01); *H04L 5/0057* (2013.01); *H04B 17/24* (2015.01); *H04B 17/382* (2015.01); *H04L 5/006* (2013.01); *H04L 5/0053* (2013.01); *H04L 2025/03808* (2013.01)

(58) Field of Classification Search
None
See application file for complete search history.

(56) References Cited

U.S. PATENT DOCUMENTS

| 2007/0098098 A1 | 5/2007 | Xiao et al. |
| 2009/0154588 A1* | 6/2009 | Chen et al. ............ 375/267 |
| 2012/0051413 A1 | 3/2012 | Xiao et al. |

FOREIGN PATENT DOCUMENTS

| CN | 101175059 A | 5/2008 |
| CN | 101300767 A | 11/2008 |
| WO | WO 2007/053403 | 5/2007 |

(Continued)

OTHER PUBLICATIONS

International Search Report, PCT/CN2010/070619, Nov. 11, 2010.
3rd Generation Partnership Project, Technical Specification Group Radio Access Network; Evolved Universal Terrestrial Radio Access (E-UTRA); Physical layer procedures (Release 8), 3GPP TS 36.213 V8.3.0 (May 2008), 45 pp.

(Continued)

*Primary Examiner* — Rhonda Murphy
(74) *Attorney, Agent, or Firm* — Myers Bigel Sibley & Sajovec, P.A.

(57) ABSTRACT

The present invention relates to a method in a base station (14, 400) and a base station (14, 400) for predicting a frequency dependent Channel State Information, CSI for scheduling and link adaptation of resource blocks of an operating bandwidth, based on frequency band CSI information related to at least one UE, the method comprising the steps receiving a wideband CSI related to UE (step 302), receiving a UE-selected subband CSI for a bandwidth part (step 302), calculating the difference: the UE-selected subband CSI for the bandwidth part minus a non UE-selected SB CSI the wideband CSI (steps 314, 328, 338), and updating a non UE-selected SB CSI for at least the bandwidth part, based on the calculated difference (steps 318, 332, 342). A faster more reliable prediction method based on UE-selected SB CSI values, is hereby achieved.

17 Claims, 3 Drawing Sheets

(56) References Cited

FOREIGN PATENT DOCUMENTS

| WO | WO 2008/052479 A1 | 5/2008 |
| WO | WO 2008/115772 A1 | 9/2008 |
| WO | WO 2008/153311 A1 | 12/2008 |

OTHER PUBLICATIONS

Wan et al., "A Fading-Insensitive Performance Metric for a Unified Link Quality Model", *IEEE Wireless Communications and Networking Conference*, 4:2110-2114, Apr. 3-6, 2006.

* cited by examiner

METHOD AND ARRANGEMENT IN A TELECOMMUNICATIONS SYSTEM

CROSS REFERENCE TO RELATED APPLICATION

This application is a 35 U.S.C. §371 national stage application of PCT International Application No. PCT/CN2010/070619, filed on 10 Feb. 2010, the disclosure and content of which is incorporated by reference herein in its entirety. The above-referenced PCT International Application was published in the English language as International Publication No. WO 2011/097796 A1 on 18 Aug. 2011.

TECHNICAL FIELD

The present invention relates to a method and arrangement in a telecommunications system, in particular it relates to a method and an arrangement for feedback compression.

BACKGROUND

A Channel Quality Indicator (CQI) is needed for link adaptation in wireless communication systems. The CQI should reflect the transmission capacity of a frequency-time channel. Thus in wideband systems with frequency selective channel fading, for example Long-Term Evolution (LTE), LTE-Advanced, and Worldwide Interoperability for Microwave Access (WiMAX), the CQI can be either of wideband type to cover the whole frequency bandwidth, or it can be of frequency selective type, which means that each CQI only covers a part of the bandwidth. For frequency selective CQI, the finer frequency granularity will lead to better channel dependent scheduling and more accurate link adaptation, thus result in higher throughput, lower BLER and shorter packet transmission delay.

However, fine frequency granularity will cause a big feedback overhead for CQI report, since the number of CQIs to cover the whole bandwidth is large. CQI compression methods are employed to save signaling overhead. In LTE, a compression method called UE-selected or Best-M is employed.

By this way, the whole bandwidth is divided into several subbands, and only a WideBand (WB) CQI and M CQIs for the M Subbands (SBs) with best Signal to Interference and Noise Ratio (SINR) are reported.

Besides frequency granularity, the age of CQI also impacts the accuracy of link adaptation, and degrades the throughput. The younger age leads to better accuracy.

In LTE, UE-selected CQI report behavior is decided by the feedback channel type. CQI can be reported in two feedback channels: physical uplink control channel (PUCCH) and physical uplink shared channel (PUSCH). PUCCH is periodic, and it does not need a scheduling trigger. PUSCH CQI is aperiodic, and it needs the signaling from the base station to trigger the report.

For PUCCH UE-selected CQI, the whole bandwidth is divided into M so-called bandwidth parts, and each bandwidth part contains several subbands. In each bandwidth part, one best subband CQI will be reported. WB CQI and SB CQI are reported in different time instance, and between two consecutive WB CQI report instances, the best SB CQI within each bandwidth part will be reported in turn, (from the $1^{st}$ bandwidth part to the last one). When all the bandwidth parts have reported its best SB CQI, a new same cycle of SB CQI reports can be initiated, or a WB CQI is reported.

For LTE PUCCH UE-selected CQI, the base station can use both WB CQI and UE-selected SB CQIs for scheduling and link adaptation. It is intuitive to use UE-selected SB CQIs for the corresponding Best-M subbands, and use WB CQI for the remaining subbands.

This solution is simple and effective if the CQI is not out-dated. However CQI can be easily outdated in practical systems, and the performance of CQI will be severely degraded.

The reason for an out-dated CQI may be a long report period. Firstly, for each PUCCH UE-selected CQI report instance, only one WB or SB CQI can be reported, and it will take a long time to update the WB CQI and all SB CQIs, especially when there are several SB CQI cycles between two WB CQIs. Secondly, since PUCCH bandwidth is very limited, when there are many user equipments (UEs) in the system, the CQI report period has to be even longer to support the CQI report of all the UEs.

In case the UE moves at a high speed the channel varies fast, and is very easily out-dated. Even for a low speed, the wideband SINR variation can be still obvious between two consecutive WB CQI updates.

It can be concluded that the WB CQI of LTE PUCCH UE-selected CQI is very likely to be out-dated. Though the best SB CQI is always younger than the WB CQI, it can not be guaranteed that only these best subbands are scheduled. If the non-best subbands are scheduled, only out-dated WB CQI can be used for their link adaptation, and the accuracy will be bad and higher block error rate (BLER) and low throughput will be achieved.

This means that the benefits of reporting CQI with finer frequency granularity is canceled out by a longer WB CQI update period.

There are some techniques which can be employed to solve the out-dated CQI problem, but these cannot provide a satisfactory solution to the problem.

There are two major ways by which channel quality is predicted, one of which combines past and current channel quality measurements to predict future channel quality. Both WO2004052982 A2 and WO2008041893 A1 employ such a method. However, none of them take the Best-M subband or UE-selected subband CQI report into consideration for prediction of channel quality.

From WO 2004052982 A2 it is disclosed a method wherein past, current and predicted CQIs are derived from one and the same downlink channel. It is a disadvantage that the channel quality at the time instances of reporting these CQI values should be related to achieving an effective prediction. Moreover, the prediction process is carried out at the UE side, which is a further disadvantage since different UEs will use different prediction algorithms. The base station will then be unaware of the algorithms used and will treat all the predicted values the same way, independently of the algorithm used by each UE. Since some CQI values are predicted for some UEs but for not for others, this clearly results in a non optimized overall CQI prediction.

Moreover, in the case only the predicted CQI is reported, different UEs can employ different algorithms to perform prediction, which can lead to different behaviors among the UEs, in case different algorithms are used. In addition, in the case raw CQI and predicted CQI are reported simultaneously, the overhead is increased on the signaling channel, which can find support by few standards only, excluding LTE.

From WO2008041893 A1 it is disclosed a prediction method to be carried out by the base station. This method does not take the frequency domain into account, which is a disadvantage. Moreover, a prediction table is required that is built by using a significant amount of measured CQI instances. This table is based on a number of conditions, for instance busy hour and night time, user equipment types etcetera, which means that it is difficult to create in reality. Further more, when using it for LTE PUCCH UE-Selected CQI reports, the WB CQI report period can be very long, for which reason the consecutive WB CQIs reports are not related in the time domain which consequently makes the prediction less efficient.

Another way to perform channel quality prediction is to reduce CQI with a fixed margin to cover channel variation during a fixed period. For instance, if the maximum Signal to Interference and Noise Ratio (SINR) variation within 10 ms is 1 dB, the CQI could be reduced with 1 dB or more. The deficiency is that CQI values are reduced with no relation to whether they are out-dated or not. Such a uniform decrease clearly impairs the system which can lead to lower system throughput.

Still another way to perform channel quality prediction may be by using outer-loop CQI adjustments based on positive acknowledge (ACK) and negative acknowledge (NACK) feedback. However, this kind of outer-loop CQI adjustment uses one and the same adjustment step for all the subbands, which will impair the UE-selected SB CQI that are not outdated. Another drawback of this alternative way is that the method is unable to adjust the CQI in advance of a transmission failure. Also, the time required for the adjustment is relatively long. Transmission in a system using this method for prediction of a channel quality is most likely to fail just before the next WB CQI update instance. At this time, the WB CQI is most out-dated, for which reason it can not provide a fast reliable prediction of CQI.

In addition, if a transmission from a UE to a base station fails just at the end and a NACK is reported to the base station, the base station will decrease the CQI. However, if the NACK is reported after the next WB CQI is reported, the base station will unnecessarily adjust the new WB CQI, which can also lead to lower throughput.

It should be noted that Channel Quality Indicator, CQI, in addition to Precode Matrix Indicator, PMI and Rank Indicator, are all comprised in Channel State Information, CSI. CQI is thus an example of CSI.

There is a need for an improved method and arrangement for CSI prediction that will provide adequate predicted values for different UEs when employing a CSI report pattern of wideband CSI, followed by several subband CSIs before another wideband CSI is reported.

SUMMARY

It is an object of the present invention to provide improved CSI prediction when employing a CSI report pattern of a wideband CSI, followed by one or more subband CSIs, and ended by second wideband CSI.

By basing the CSI predictions of non UE-selected SB CSI on UE-selected SB CSI reports and wideband CSI reports, a fast reliable prediction is achieved.

According to an aspect of the present invention, there is provided a method in a base station for predicting a frequency dependent Channel State Information, CSI for scheduling and link adaptation of resource blocks of an operating bandwidth comprising a number of bandwidth parts, based on frequency band CSI information related to a UE. The method comprising the steps of receiving a wideband CSI related to UE, from the UE, receiving UE-selected subband CSI from the UE, obtaining bandwidth part related CSI parameter. The method further comprises determining an estimate of CSI for non UE-selected subbands from the received wideband CSI and the obtained bandwidth part related CSI parameter, determining a difference between the UE-selected subband CSI and the estimated CSI for non UE-selected subbands, and updating the estimate of CSI for non-selected subbands, based on said determined difference between the UE-selected subband CSI and the estimated CSI for non UE-selected subbands.

The step of updating may further comprise updating the bandwidth part related CSI parameter based on the determined difference between the UE-selected subband CSI and the estimated CSI for non UE-selected subbands.

The step of receiving a UE-selected subband CSI may further comprise receiving a UE-selected subband CSI for a first bandwidth part, the step of obtaining a bandwidth part related CSI parameter may comprise obtaining a CSI margin value for the first bandwidth part, the step of determining an estimate of CSI for non UE-selected subbands may further comprise determining an estimate of CSI for non UE-selected subbands for the first bandwidth part, from the obtained wideband CSI and the obtained CSI margin value for the first bandwidth part, the step of determining a difference may further comprise determining a difference between the UE-selected subband CSI for the first bandwidth part and the estimated CSI for non UE-selected subbands for the first bandwidth part, and the step of updating the estimate may further comprise updating the estimate of CSI for non UE-selected subbands within the first bandwidth part by updating the CSI margin value for the first bandwidth part, based on the determined difference between the UE-selected subband CSI for the first bandwidth part and the estimated CSI for non UE-selected subbands for the first bandwidth part.

The step of determining a difference may further comprise calculating the difference of the estimated CSI for non UE-selected subbands for the first bandwidth part minus the UE-selected subband CSI for the first bandwidth part.

The step of updating may further comprise decreasing the CSI margin value for the first bandwidth part if the calculated difference is larger than a CSI threshold.

The step of receiving UE-selected subband CSI may further comprise receiving a UE-selected subband CSI for at least a second bandwidth part, the step of obtaining may further comprise obtaining a CSI margin value for the second bandwidth part. The step of determining an estimate of CSI for non UE-selected subbands may further comprise determining an estimate of CSI for non UE-selected subbands for the second bandwidth part from the obtained wideband CSI and the obtained CSI margin value for the second bandwidth part, the step of determining a difference may further comprise determining a difference between the UE-selected subband CSI for the second bandwidth part and the estimated CSI for non UE-selected subbands for the second bandwidth part, and the step of updating the estimate may further comprise updating the estimate of CSI for non UE-selected subbands within the second bandwidth part by updating the CSI margin value for the second bandwidth part, based on the determined difference between the UE-selected subband CSI for the second bandwidth part and the estimated CSI for non UE-selected subbands for the second bandwidth part and the determined difference between the UE-selected subband CSI for the first bandwidth part and the estimated CSI for non UE-selected subbands for the first bandwidth part.

The step of updating may further comprise updating the estimate of CSI for non UE-selected subband for two or more bandwidth parts, by updating CSI margin value for two or more bandwidth parts, based on the determined difference between the UE-selected subband CSI for the second bandwidth part and the estimated CSI for non UE-selected subbands for the second bandwidth part and the determined difference between the UE-selected subband CSI for the first bandwidth part and the estimated CSI for non UE-selected subbands for the first bandwidth part.

The step of determining a difference may further comprise determining a second bandwidth part related difference by calculating the difference of the estimated CSI for non UE-selected subbands for the second bandwidth part minus the UE-selected subband CSI for the second bandwidth part and determining a first bandwidth part related difference by calculating the difference of the estimated CSI for non UE-selected subbands for the first bandwidth part minus the UE-selected subband CSI for the first bandwidth part.

The step of updating may further comprise decreasing the CSI margin value for a second bandwidth part if the calculated second bandwidth part related difference is larger than a second CSI threshold and the calculated first bandwidth part related difference is larger than a first CSI threshold.

According to another aspect of the present invention, there is provided a base station that is configured to predict a frequency dependent Channel State Information, CSI, value for scheduling and link adaptation of resource blocks of an operating bandwidth, comprising at least one bandwidth part, based on frequency band CSI information related to a UE. This base station comprises a transceiving unit, a processing unit and an updating unit. The transceiving unit is configured to receive a wideband CSI from the UE, and to receive UE-selected subband CSI from a UE, whereas the processing unit is operatively connected to the transceiving unit, and configured to obtain a bandwidth part related CSI parameter, to determine an estimate of CSI for non UE-selected subbands from the received wideband CSI and the obtained bandwidth part related CSI parameter, and to determine a difference between the UE-selected subband CSI and the estimated CSI for non UE-selected subbands. The updating unit is operatively connected to the processing unit and configured to update the estimate of CSI for non-selected subbands, based on said determined difference between the UE-selected subband CSI and the estimated CSI for non UE-selected subbands.

The updating unit may further comprise a triggering unit that, based on said determined difference between the UE-selected subband CSI and the estimated CSI for non UE-selected subbands, is configured to trigger the updating unit to update the estimate of CSI for non-selected subbands.

The transceiving unit may further be configured to receive a UE-selected subband CSI for a first bandwidth part, the processing unit may further be configured to obtain a CSI margin value parameter for the first bandwidth part, to determine an estimate of CSI for non UE-selected subbands for the first bandwidth part, from the obtained wideband CSI and the obtained CSI margin value parameter for the first bandwidth part, to calculate the difference of the estimated CSI for non UE-selected subbands for the first bandwidth part minus the UE-selected subband CSI for the first bandwidth part, the triggering unit may be configured to trigger, based on the calculated difference, the updating unit to update the estimate of CSI for non UE-selected subbands within the first bandwidth part by updating the CSI margin value for the first bandwidth part.

The updating unit may further be configured to decrease the CSI margin value parameter for the first bandwidth part if the calculated difference is larger than a CSI threshold.

The transceiving unit may further be configured to receive a UE-selected subband CSI for at least a second bandwidth part, the processing unit may further be configured to obtain a CSI margin value parameter for the second bandwidth part, to determine an estimate of CSI for non UE-selected subbands for the second bandwidth part from the obtained wideband CSI and the obtained CSI margin value parameter for the second bandwidth part, to determine a difference between the UE-selected subband CSI for the second bandwidth part and the estimated CSI for non UE-selected subbands for the second bandwidth part, and the triggering unit may further be configured to trigger the updating unit, based on the determined difference between the UE-selected subband CSI for the second bandwidth part and the estimated CSI for non UE-selected subbands for the second bandwidth part, and the determined difference between the UE-selected subband CSI for the first bandwidth part and the estimated CSI for non UE-selected subbands for the first bandwidth part, to update the estimate of CSI for non UE-selected subbands within the second bandwidth part by updating the CSI margin value for the second bandwidth part.

The triggering unit may further be configured to trigger the updating unit, based on the determined difference between the UE-selected subband CSI for the second bandwidth part and the estimated CSI for non UE-selected subbands for the second bandwidth part and the determined difference between the UE-selected subband CSI for the first bandwidth part and the estimated CSI for non UE-selected subbands for the first bandwidth part, to update the estimate of CSI for non UE-selected subband for two or more bandwidth parts, by updating CSI margin value for said two or more bandwidth parts.

The processing unit may further be configured to determine a second bandwidth part related difference by calculating the difference of the estimated CSI for non UE-selected subbands for the second bandwidth part minus the UE-selected subband CSI for the second bandwidth part and to determine a first bandwidth part related difference by calculating the difference of the estimated CSI for non UE-selected subbands for the first bandwidth part minus the UE-selected subband CSI for the first bandwidth part.

The triggering unit may further be configured to trigger the updating unit to decrease the CSI margin value for the second bandwidth part, if the calculated second bandwidth part related difference is larger than a second CSI threshold and the calculated first bandwidth part related difference is larger than a first CSI threshold.

Among the advantages with embodiments of the present invention can be mentioned:

At least a few embodiments of the present invention help to reduce the risk of high BLER and unnecessary retransmission caused by out-dated CSI when the practical SINR is descending.

Since decreasing SINR decreases the CSI for such channels, it reduces the probability for these channels to be scheduled to avoid transmission error when channel dependent scheduling is used, because lower CSI leads to lower probability of being scheduled when using channel dependent scheduling.

In addition, a more conservative link adaptation for these channels would result if they were still scheduled. As a by-product, UEs with fresh CSI have a better chance to be scheduled, and their link adaptation is more accurate for these UEs.

The link adaptation can also catch up with the increasing SINR by increasing non UE-selected SB CSI values. The system throughput performance can thus be improved.

BRIEF DESCRIPTION OF DRAWINGS

In order to explain advantages and features of the present invention herein in more detail a few embodiments will be described below, where references are made to the accompanying drawings, for which

ABBREVIATIONS/DEFINITIONS

ACK ACKnowledgement
BLER BLock Error Rate
CQI Channel Quality Indicator
CSI Channel State Information
LTE Long Term Evolution
NACK Negative ACK
PUCCH Physical Uplink Control CHannel
PUSCH Physical Uplink Shared CHannel
RB Resource Block
RRC Radio Resource Control
SB SubBand
SINR Signal to Interference and Noise Ratio
UE User Equipment
WB WideBand
WIMAX Worldwide Interoperability for Microwave Access

DETAILED DESCRIPTION

The focus of embodiments of the present invention is Long Term Evolution (LTE) Physical Uplink Control Channel, PUCCH UE-selected Channel State Information (CSI). The embodiments are however not limited to this CSI report behavior. It could be applied to any CSI report behavior, which reports WB CSI and SB CSI in different time instances.

Figure 1:
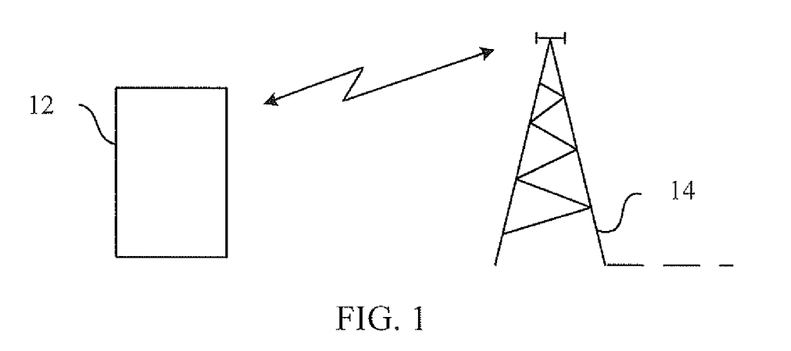
FIG. 1 illustrates part of a telecommunications system related to embodiments of the present invention.

The embodiments of the present invention enable the usage of CSI for a UE-selected subband (SB) within each bandwidth part to predict the CSI of the other subbands in the same or more bandwidth parts. This is for example applicable to a wireless telecommunication system, as presented in FIG. 1, showing a UE 12 connected to a base station 14, such as a Node-B or an enhanced Node-B.

The embodiments of the present invention are further designed to improve the usage of the LTE PUCCH UE-selected CSI, such as Channel Quality Indicator (CQI).

According to 3GPP TS 36.213 v9.0.1, J*K reporting instances are used in sequence for subband CQI reports on K full cycles of bandwidth parts, between two consecutive wideband CQI reports on PUCCH. For each bandwidth part, the UE reports the CQI of the subband with highest Signal to Interference and Noise Ratio (SINR). Based on this assumption, a concept of CQI report pattern is defined as a consecutive sequence of CQI reports in time domain in the form of WB CQI, SB CQI, . . . , WB CQI.

At least some embodiments of the present invention also support any wideband wireless communication systems having a CSI report pattern of wideband CSI followed by several side-band CSIs before a next wideband CSI is reported. The pattern is presented as: WB CSI, $1^{st}$ SB CSI, $2^{nd}$ SB CSI, . . . , $J^{th}$ SB CSI, WB CSI, where J denotes the number of bandwidth parts, in which the entire system bandwidth is divided.

For each bandwidth part the UE is configured to select the subband having the highest SINR value and report the corresponding CSI to the base station. For LTE, the entire bandwidth may be divided into four bandwidth parts, J=4. This number is however dependent on the system bandwidth, for which reason J may be 1, 2, 3 or 4. Each bandwidth part comprises one or more subbands, and a CSI report is sent for each bandwidth part K times between two consecutive WB CSI instances, where K denotes the number of full cycles of J reports. The UE thus selects the subband having the highest SINR value for each bandwidth part and reports this CSI to the base station.

Since the UE only sends frequency dependent reports for the UE selected SB CSI, the base station may need to determine the CSI for the non-selected subbands, since it can not be guaranteed that only these UE selected SBs need to be scheduled. Therefore, even non-selected SB may have to be scheduled.

The determination of CSI for non UE-selected SB, is based on WB CSI. However, WB CSI easily becomes out-dated, which can lead to an increased BLock Error Rate (BLER) and a low throughput.

In order to avoid using WB CSI reports only, the determination of CSI for non UE-selected SBs is also based on CSI reports for the UE-selected SB.

The CSI is thus determined for non UE-selected subbands within each bandwidth part. After having received the WB CSI and a first UE-selected SB CSI for a bandwidth part, a CSI value for non UE-selected SBs for the same bandwidth part is estimated. Based on the difference between the UE-selected SB CSI and the estimated non UE-selected SB CSI, the estimated non UE-selected SB CSI is updated. This updated non UE-selected SB CSI value then serves as a basis for link adaptation and for further determinations of CSI values for non UE-selected SBs for other bandwidth parts.

For subsequent bandwidth parts, the determination of CSI is thus performed iteratively, where the CSI value is based on received UE-selected subband CSIs and CSI estimates for non UE-selected subbands for one or more former bandwidth parts.

Accordingly, based on the received UE selected SB CSI and the received WB CSI, and also former estimates of the non UE-selected SB CSI, the base station determines an update of non UE-selected SB CSI. Based on the difference between an estimate of CSI for non UE-selected SB for a bandwidth part and the UE-selected SB CSI for the same bandwidth part, the base station determines how to update the non UE-selected SB CSI value within the bandwidth part.

Also, based on further calculated differences between estimates of CSI for non UE-selected subband and received UE-selected subband CSI, an estimate of CSI for non UE-selected subband in each bandwidth part more bandwidth parts is determined, as will be more described below.

The determination of CSI values may be divided into two separate but related functions, processing and updating, each having access to received CSI information.

Figure 2:
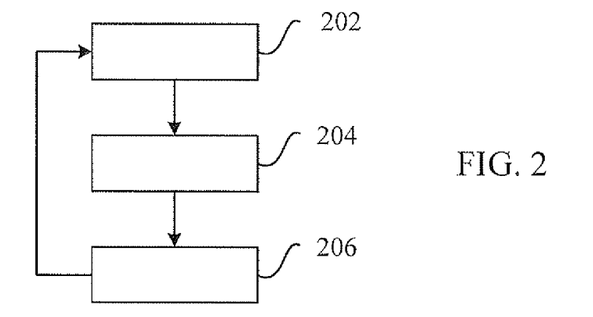
FIG. 2 illustrates a schematic flow-chart of method steps according to some embodiments of the present invention.

FIG. 2 schematically illustrates a simplified flow-chart of method steps according to some embodiments of the present invention.

First, in step 202, CSI information comprising a wideband CSI and thereafter following UE-selected subband CSI values, is received from the UE by the base station.

The processing function determines an estimate of non UE-selected SB CSI based on the received WB CSI. The processing function compares an estimate of non UE-selected SB CSI values and UE-selected SB CSI values, by calculating the estimate of non UE-selected SB CSI minus the UE-selected SB CSI for the same bandwidth part, in step 204. Based on this calculated difference, the processing function may send a triggering signal to the updating function for triggering updating of the estimate of non UE-selected SB CSI difference.

In step 206, updating of the estimate of non UE-selected SB CSI is performed in the time-frequency domain, achieving an updated determination of the CSI value for non UE-selected SBs. Updating may be performed decreasing the estimate of the CSI value for non UE-selected subband, for either one or more bandwidth parts of the entire system bandwidth.

Having achieved an updated determination of the CSI value for non UE-selected SBs more CSI reports from the UE can be received the base station, in a novel step 202.

Figure 3A:
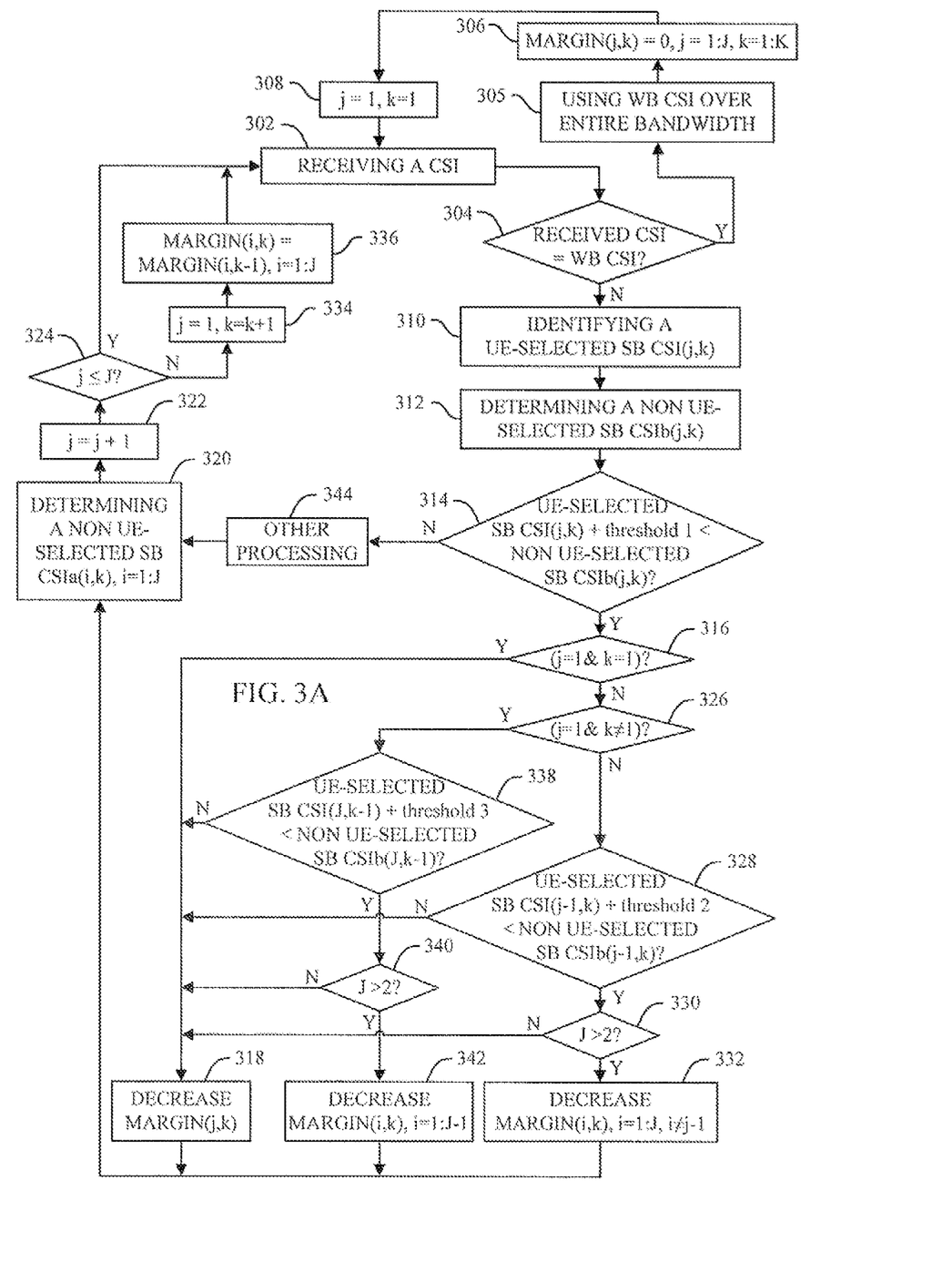
FIG. 3A illustrates a flow-chart of method steps according to some embodiments of the present invention.

FIG. 3A illustrates a flow-chart of method steps for predicting a frequency dependent Channel State Information, CSI, by decreasing the CSI estimate for non UE-selected SBs.

Updating is alternatively performed in the time-frequency domain by increasing a CSI value for non UE-selected subband, according to alternative embodiments of the present invention. However, since the received UE-selected subband CSI values are reported for the subband having the highest SINR of the bandwidth, there is no information about the SINR of the remaining non UE-selected subbands. These may be high or low. For this reason, updating estimates of CSI values for non UE-selected subband by increasing the CSI estimate, requires additional considerations. Updating the CSI estimate by increasing the CSI estimate for non UE-selected SB will be described with reference to FIG. 3B, down below.

It should be explicitly mentioned that the UE reports a UE-selected SB CSI for each bandwidth part j, where j ranges from 1 to J. Also, the UE-selected SB CSI is indexed with k according to the number of times it is received by the base station. The UE-selected SB CSI is therefore written as UE-selected SB CSI(j,k).

As briefly described above, determining a CSI(j,k) for non UE-selected SBs for each bandwidth part is carried out by first determining an estimate of the CSI value. This CSI estimate of non UE-selected SB for bandwidth part j and cycle k, is denoted "non UE-selected SB CSIb(j,k)", where "b" denotes "before" update, which means that it is indeed an estimate.

The non UE-selected SB CSIb(j,k) is thus updated achieving a determined CSI value for non UE-selected SB. For this reason a bandwidth part related CSI margin parameter, MARGIN(j,k), for bandwidth part j and full cycle k, is defined. By determining an update of the value of the MARGIN(j,k) parameter, an update of the non UE-selected SB CSIb(j,k) is achieved.

The updated CSI for non UE-selected SB SCI, is herein denoted a "non UE-selected SB CSIa(j,k)", where "a" denotes "after" update.

The processing function, as mentioned above, is based on both the UE-selected SB CSI(j,k), and non UE-selected SB CSIb(j,k) for bandwidth part j at cycle instance k, where j ranges from 1 to J, and k ranges from 1 to maximum number of cycles K.

TABLE 1

Number of bandwidth parts, J for various number of subbands defining the system bandwidth.

| System Bandwidth (Subband) | Bandwidth Part J |
|---|---|
| 6-7 | NA |
| 8-10 | 1 |
| 11-26 | 2 |
| 27-63 | 3 |
| 64-110 | 4 |

Once the system bandwidth is decided, the number of bandwidth parts, i.e. J is decided according to Table 1.

It can be mentioned that the maximum number of cycles K is configured by a higher layer, such as Radio Resource Control, RRC, or by others.

The updating function for updating the MARGIN(j,k) value can be based on a few different parameters, of which some can be the UE-selected SB CSI(j,k), the estimate of the CSI for non UE-selected SB CSI, i.e. the non UE-selected SB CSIb(j,k), and at least one CSI threshold parameter. A flowchart illustrating a process how to determine the update of an estimated CSI value for non UE-selected SBs for one or more bandwidth parts, will be presented below.

In the case a criterion of the processing function is fulfilled, the updating function can be triggered by the processing function to determine how to update the MARGIN(j,k) value and therefore also how to update the CSI estimate for non UE-selected subbands for one or more bandwidth parts.

With reference to FIG. 3A, the process of determining an update of a non UE-selected SB CSI will be more described.

Firstly, the UE reports a WB CSI to the base station, which WB CSI is a calculated average value of the CSI over the entire bandwidth, as determined by the UE. It is noted that the WB CSI is constructed by the UE by calculating a mean CSI over the entire system bandwidth.

In step 302 the base station thus receives a CSI report from the UE. In step 304 the base station determines whether the received CSI is a WB CSI or not. It is noted that the received CSI may be either a WideBand (WB) CSI or a UE-selected SubBand (SB) CSI.

At this early stage the base station determines that the received CSI report is indeed a WB CSI, in step 304.

Since this WB CSI is an up to date CSI value for the overall bandwidth it is used for link adaptation and for scheduling over the entire bandwidth, in step 305, until a UE-selected SB CSI report is received by the base station.

As the reported WB CSI on the one hand easily becomes outdated it serves less well as a CSI estimate for non UE-selected SB with increasing time. The non UE-selected SB CSIb(j,k) can on the other hand be updated by updating the value of the CSI parameter MARGIN(j,k) and thereby achieve an up to date non UE-selected SB CSIa(j,k). It is noted that the value of the MARGIN(j,k) parameter may be either positive or negative.

The next step of the method for predicting a frequency dependent Channel State information, CSI value, provided the received CSI is a WB CSI, is step 306, in which the CSI parameters MARGIN(j,k) values, where j=1, . . . , J and k=1, . . . K, are reset to zero (0). Down below it will become clear that a MARGIN(j,k) parameter value that equals zero corresponds to a non outdated WB CSI.

The following step, step 308, is setting bandwidth parameter j=1, and cycle number parameter k=1, in order to set j and k for the next CSI to be received.

Following the flow-chart of LTE PUCCH CSI reporting, after reporting a wideband CSI to the base station, the UE reports a CSI of a subband that is selected by the UE. As mentioned above the UE selects the CSI of the subband with the highest Signal to Interference and Noise Ration (SINR), as detected by the UE.

Subsequent to step 308, the base station thus receives a CSI report in new step 302. The base station now notes in step 304 that the CSI report is not a WB CSI but rather a UE-selected SB CSI report, following the CSI reporting pattern of WB CSI, SB CSI, . . . , WB CSI.

The base station now identifies the UE-selected SB CSI(j,k) in step 310, for which j=1 and k=1.

In step 312 an estimate of the non UE-selected SB CSI for bandwidth part j before adjustment in cycle k is determined. The estimate is calculated based on the WB CSI and the MARGIN(j,k) value. The CSI estimate is hence calculated according to equation 1 and equation 2, wherein (j,k)=(1,1);

$$\text{non UE-selected SB CSI}b(j,k)=\text{WB CSI}+\text{MARGIN}(j,k) \quad (\text{eq. 1})$$

$$\text{MARGIN}(j,k)=0 \quad (\text{eq. 2})$$

It is noted that an estimate is calculated, for which reason the CSI parameter is defined as non UE-selected SB CSIb(j, k), with a "b", which stands for "before" adjustment. As MARGIN(1,1) value equals zero, the estimated non UE-selected SB CSIb(1,1) thus equals to WB CSI.

In order to determine how the estimated non UE-selected SB CSI(1,1) shall be updated, a comparison with the UE-selected SB CSI(1,1) is made. The base station thus compares the UE-selected SB CSI(1,1) with the estimate of the non UE-selected SB CSIb(1,1), i.e. before adjustment, and determine whether equation 3 is fulfilled or not in step 314, (j,k)=(1,1), where $$\text{UE-selected SB CSI}(j,k)+\text{threshold 1}<\text{non UE-selected SB CSI}b(j,k) \quad (\text{eq. 3})$$

The base station here calculates a difference between the UE-selected SB CSI and the estimated CSI for non UE-selected SBs.

The threshold 1 in equation 3 is a parameter that is introduced such that the non UE-selected SB CSIb(1,1) is updated by decreasing the value of MARGIN(1,1) in the case the UE-selected SB CSI(1,1) is smaller than the corresponding non UE-selected SB CSIb(1,1) by the threshold 1 parameter. It is thus introduced to avoid unnecessarily decrease or change of the non UE-selected SB CSIb(1,1) estimate.

The reason to decrease the estimate of UE-selected SB CSIb(1,1) will be further described below.

As mentioned earlier, the UE selects one SB per bandwidth part by selecting the SB having the highest SINR.

Usually, the CSI of the SBs having the highest SINR will be larger than the WB CSI unless they are out-dated, and the distribution of the difference between SB CSI and WB CSI can be gained by simulation or long-term observation in practical networks. If the difference is smaller than, for instance, the value of the CSI threshold 1 parameter value or even a negative value, then it is very likely that the current SINR for non-reported subbands is already lower than the WB CSI.

Besides, if best SB CSI is smaller than the WB CSI reported, then it means that all SB CSIs within the same bandwidth part are smaller than the best SB CSI, thus they are even smaller than the WB CSI, and should consequently be decreased.

By determining a distribution of the difference between UE-selected SB CSI and non UE-selected SB CSI by means of simulation or observation, one or more threshold parameters can be set according to this distribution.

Now, if the base station determines that equation 3 is fulfilled in step 314, the base station checks whether j=1 and k=1, or not, i.e. whether the current bandwidth part is the first bandwidth part and the cycle is the first cycle, or not, in step 316.

If j=1 and k=1 in step 308 the updating function is triggered to decrease the value of MARGIN(1,1).

The amount to decrease the value of MARGIN(j,k) when (j,k)=(1,1,) may be based on the difference between the UE-selected SB CSI and the estimate of non UE-selected SB CSI. Based on statistics, good estimates of the decrease of the value of MARGIN(j,k) may be achieved.

Having decreased the value of MARGIN(1,1) in step 318, the following step is the step of determining up to date non UE-selected SB CSIa(i,k) for i=1:J and k=1, i.e. over the entire bandwidth, according to equation 4, in step 320.

$$\text{non UE-selected SB CSI}a(j,1)=\text{WB CSI}+\text{MARGIN}(j,1) \quad (\text{eq. 4})$$

It is thus calculated up to date CSI values for the bandwidth parts j=1, J, and k=1

$$\text{non UE-selected SB CSI}a(1,k)=\text{WB CSI}+\text{MARGIN}(1,k) \quad (\text{eq. 5})$$

$$\text{non UE-selected SB CSI}a(2,k)=\text{WB CSI}+\text{MARGIN}(2,k) \quad (\text{eq. 6})$$

$$\text{non UE-selected SB CSI}a(J,k)=\text{WB CSI}+\text{MARGIN}(J,k) \quad (\text{eq. 7})$$

Whereas MARGIN(1,1) was updated in step 318, the remaining MARGIN(2,1), . . . , MARGIN(J,1) were not updated and therefore equal zero.

The determined non UE-selected SB CSIa(j,1), j=1:J is thus used for link adaptation and for scheduling by the base station.

Having calculated CSI values in step 320, following equation 4, the next step is step 322 of incrementing counter j by setting j=j+1. The parameter j thus becomes 2.

In step 324 it is determined whether j≤J or not. It is thus now determined whether 2≤J nor not.

However, in the case step 324 is negative, the following step is step 334, wherein j is set to 1 and k is incremented to 2. Thereafter MARGIN(i,k) is set to MARGIN(i,k−1), i=1:J in step 336. This means that MARGIN(1,2)=MARGIN(1,1), MARGIN(2,2)=MARGIN(2,1) etc up to MARGIN(J,2)=MARGIN(J,1).

In order to describe the method steps within the flowchart as illustrated in FIG. 3A, J is in this example configured to be 3. As mentioned above J could be either 1, 2, 3 or 4.

Accordingly, step 324 is affirmative and next step is receiving a CSI in new step 302.

In step 304 it is then determined that the received CSI is not a WB CS. A UE-selected SB CSI(j,k), (j,k)=(2,1) is then identified in step 312.

A CSI estimate before update is now determined by using equations 1 and 2, for (j,k)=(2,1), thereby achieving equations 8 and 9. Accordingly, $$\text{non UE-selected SB CSI}b(2,1)=\text{WB CSI}+\text{MARGIN}(2,1) \quad (\text{eq. 8})$$

$$\text{MARGIN}(2,1)=0 \quad (\text{eq. 9})$$

It should be mentioned that the value of MARGIN(2,1) is zero as it was earlier reset in step 306.

As a CSI estimate for the second bandwidth part is calculated it can be compared to the UE-selected SB CSI for said same bandwidth part, i.e. j=2.

In new step 314, equation 3 is thus used for (j,k)=(2,1) giving

UE-selected SB CSI(2,1)+threshold 1<non UE-selected SB CSI$b$(2,1)     (eq. 10)

In order to determine whether step 314 is affirmative or not, the base station calculates non UE-selected CSIb(2,1) minus UE-selected SB CSI(2,1). If this difference is larger than threshold 1, step 314 is affirmative.

If step 314 is affirmative, it is determined in step 316 whether j=1 and k=1, or not. Since j=2, step 316 is negative, leading to step 326 wherein it is determined whether j=1 and k≠1, or not. Since j=2, step 326 is negative leading to step 328.

In step 328 the base station determines how UE-selected SB CSI(j−1,k) compares to non UE-selected SB CSI(j−1,k) according to equation 11 for (j,k)=(2,1)

UE-selected SB CSI($j$−1,$k$)+threshold 2<non UE-selected SB CSI$b$($j$−1,$k$)     (eq. 11)

Since j is 2, and j−1 therefore equals 1, the calculation as performed in step 328 is the same as calculated in step 314 for (j,k)=(1,1).

The base station thus determines whether step 328 is affirmative or negative, for (j,k)=(2,1). In order to determine whether step 328 is affirmative or not, the base station now calculates non UE-selected CSIb(1,1) minus UE-selected SB CSI(1,1). If this difference is larger than the threshold 2, step 328 is affirmative.

Provided step 328 is affirmative, the following step is step 330, determining whether J>2, or not. Since J was set to 3 in this example, according to some embodiments of the present invention, step 330 is affirmative leading to step 332, in which the value of a few MARGIN parameters is decreased. More precisely, the value of MARGIN(i,k) will be decreased for i=1:J, i≠j−1, i.e. the value of MARGIN(2,1) and MARGIN (3,1) will be decreased.

The value of MARGIN(1,1) will thus not be decreased because i cannot be equal to j−1, when j=2 The reason for this is that the value of MARGIN(1,1) was already decreased in step 318 for (j,k)=(1,1) as described above. The value of MARGIN(1,1) is thus already recently updated and shall hence not be decreased again at this stage.

In the case step 328 is negative for (j,k)=(2,1) within equation 11, the next step is step 318 of decreasing the value of MARGIN(2,1). In this case the value of MARGIN(2,1) is thus decreased, whereas the value of MARGIN(3,1) is not changed.

In the case step 330 is negative for (j,k)=(2,1), i.e. if J were 1 or 2, the following step would be to decrease the value of MARGIN(j,k) in step 318. As earlier mentioned, within this example J is set to 3, but may alternatively be any one of 1, 2, 3 and 4.

The step following step 332 or step 318, as above is then step 320, determining a non UE-selected SB CSIa(i,k), i=1:J, k=1 following equations 5-7. Hence non UE-selected SB CSI$a$(1,$k$)=WB CSI+ MARGIN(1,$k$)     (eq. 5)

non UE-selected SB CSI$a$(2,$k$)=WB CSI +MARGIN(2,$k$)     (eq. 6)

non UE-selected SB CSI$a$($J$,$k$)=WB CSI+ MARGIN($J$,$k$)     (eq. 7)

where MARGIN(2,1) or MARGIN(2,1) and MARGIN(3,1) if J=3, may have been updated as described above.

The determined CSI values, non UE-selected SB CSIa(1, k), . . . , non UE-selected SB CSIa(J,k), from equations 5, 6 and 7 may now be used for link adaptation and scheduling.

After the determination in step 320, the next step is step 322 of incrementing j and determining whether j≤J or not, in step 324. Since the incremented j equals 3 in step 322 and 3≤J when J is 3, step 324 is affirmative.

In the following a CSI, which is not a WB CSI, is received in step 302, where after it is identified as non UE-selected SB CSI(3,1) in step 310, since j=3 and k still is 1.

Since the following steps for (j,k)=(3,1), considering that step 314 is affirmative, are similar to the steps for (j,k)=(2,1), the steps for (3,1) will only briefly be described.

An affirmative step 314 leads to 328 via negative steps 316 and 326. Within step 328, it is checked whether the equation 11 is fulfilled for (j,k)=(3,1) or not. If equation 11 is affirmative, i.e. if equation 3 is affirmative for (j−1,k)=(3−1,1), it is determined that step 330 is affirmative since J=3, where after step 332 of decreasing the value of MARGIN(i,k), i=1:J, i≠j−1 is performed by the base station. Since j=3, the value of MARGIN(i,k) is not decreased for (2,1). Accordingly, the value of MARGIN(1,1) and MARGIN(3,1) is decreased in step 332.

In the case step 328 is negative because equation 3 for (j,k)=(2,1) is not fulfilled, the next step is step 318 of decreasing the value of MARGIN(3,1) only.

Having reached either step 318 or step 332 for (j,k)=(3,1), the following step is again to determine non UE-selected SB CSIa(i,k), i=1:J in step 320, according to equations 5, 6 and 7, by using the updated MARGIN(1,1) or MARGIN(1,1) and MARGIN(3,1).

Again, determined CSI values for bandwidth parts 1, 2 and 3, from step 320 is thus again used for link adaptation and for scheduling.

In the foregoing steps, UE-selected SB CSI reports were thus received for bandwidth parts 1, 2 and 3, i.e. covering the entire bandwidth according to this configuration of having J=3.

Now, when setting j=j+1 in step 322 and determining whether j≤J or not, in step 324, it is thus determined that step 324 is negative since j=j+1 equals 4 and J=3. This leads to step 334 wherein j is reset to 1 and k is incremented to 2. A first full cycle of CSI reports for J bandwidth parts is thus completed and another, i.e. a second, is to start.

In step 336 the determined MARGIN values valid for k=1 are thus transferred to MARGIN values for k=2, according to MARGIN($i$,$k$)=MARGIN($i$,$k$−1), $i$=1:$J$     (eq. 12)

by which the MARGIN value for each one of MARGIN(1, 2), . . . , MARGIN(J,2) is defined.

Having updated the value of MARGIN(i,k) for k=2, the next step is step 302 of receiving a CSI. If the received CSI is a wideband CSI, as calculated by the UE, step 304 is affirmative, else it is negative.

In the current example it is supposed that K>1, for which reason the received CSI from step 302 is not a WB CSI, but a UE-selected SB CSI, as identified in step 310, wherein (j,k)=(1,2).

In step 312, equation 1 for (j,k)=(1,2) is thus calculated whereby non UE-selected SB CSI$b$(1,2)=WB CSI+ MARGIN(1,2)     (eq. 13)

It is mentioned that the value of MARGIN(1,2) was earlier set to zero in step 306. It is now calculated an estimate of non UE-selected SB CSI for bandwidth part j=1 and cycle k=2.

As the CSI estimate for the first bandwidth part was calculated it can be compared to the UE-selected SB CSI for the first bandwidth part. In novel step 314, equation 3 is thus used for (j,k)=(1,2) giving $$\text{UE-selected SB CSI}(1,2)+\text{threshold 1}<\text{non UE-selected SB CSI}b(1,2) \quad \text{(eq. 14)}$$

If the UE-selected SB CSI(1,2) is smaller by a threshold 1 than non UE-selected SB CSIb(1,2), i.e. if step 314 is affirmative, it is determined in step 316 whether j=1 and k=1, or not.

The base station calculates the difference between non UE-selected SB CSIb(1,2) and UE-selected SB CSI(1,2), in the same way as described earlier in connection to step 314.

As j=1 but k=2, step 316 is negative, leading to step 326 wherein it is determined whether j=1 and k≠1, or not. Since j=1 and k indeed is 2, which does not equal 1, step 326 is positive, leading to step 338.

Within step 338, a former received UE-selected SB CSI is compared to a former non UE-selected SB CSI. More precisely, it is determined whether equation 15 is fulfilled or not, wherein equation 15, wherein J=3 and k=2, is $$\text{UE-selected SB CSI}(J,k-1)+\text{threshold 3}<\text{non UE-selected SB CSI}b(J,k-1) \quad \text{(eq. 15)}$$

Since J=3 and k=2, k−1 becomes 1, UE-selected SB CSI (3,1) and non UE-selected SB CSIb(3,1) are compared with one another. If it is determined that UE-selected SB CSI(3,1) is smaller by the threshold 3 than non UE-selected SB CSIb (3,1) in step 338, the next step is the step of determining whether J>2 or not in step 340. As J>3 within the current example, step 340 is affirmative, leading to step 342 of decreasing the value of MARGIN(i,k), i=1:J−1. The value of MARGIN(1,2) and MARGIN(2,2) are thus now decreased since the value of MARGIN(3,2) is not decreased for the reason that MARGIN(3,1) was already decreased in a former step 318 or step 332.

If step 338 for (j,k)=(1,2) is negative, the value of MARGIN(1,2) only would be decreased in step 318. Also, In the case J were 1 or 2, step 340 would be negative and the value of MARGIN(1,2) would be decreased in step 318 following the flow chart in FIG. 3A.

Now, having decreased the value of MARGIN(1,2) in step 318 or MARGIN(1,2) and MARGIN(2,2) in step 342, the following step is determining a non UE-selected SB CSIa(i, k), i=1:J, k=2 in step 320. Equations 5, 6 and 7 are here used with k=2, $$\text{non UE-selected SB CSI}a(1,k)=\text{WB CSI}+\text{MARGIN}(1,k) \quad \text{(eq. 5)}$$

$$\text{non UE-selected SB CSI}a(2,k)=\text{WB CSI}+\text{MARGIN}(2,k) \quad \text{(eq. 6)}$$

$$\text{non UE-selected SB CSI}a(J,k)=\text{WB CSI}+\text{MARGIN}(J,k) \quad \text{(eq. 7)}$$

It is thus determined current UE-selected SB CSIa(j,k) values for (1,2), (2,2) and (3,2), which in the same way as prior determined non UE-selected SB CSIa(j,k) values, can be used for link adaptation and scheduling.

The forthcoming steps follow the earlier described steps, as outlined above. Provided step 314 is affirmative, the value of one or more MARGIN(i,k) parameters is decreased before calculation of new non UE-selected SB CSIa(j,k). Until it is determined in another step 304 that a WB CSI was received in novel step 302, the bandwidth part j and current cycle k is incremented. As k ranges from 1 to K the last full cycle k is K before receiving a WB CSI.

The value of the maximum number of cycles, K is configured by a higher layer, such as Radio Resource Control, RRC, or possibly by others.

Until now, the steps, as described above, have been performed according to an affirmative step 314, and method steps within flow-chart as illustrated in FIG. 3A have been made reference to. The comparison within step 314 may well be negative, for which reason the following step is step 344, before determining non UE-selected SB CSIa(j,k) in step 320.

Figure 3B:
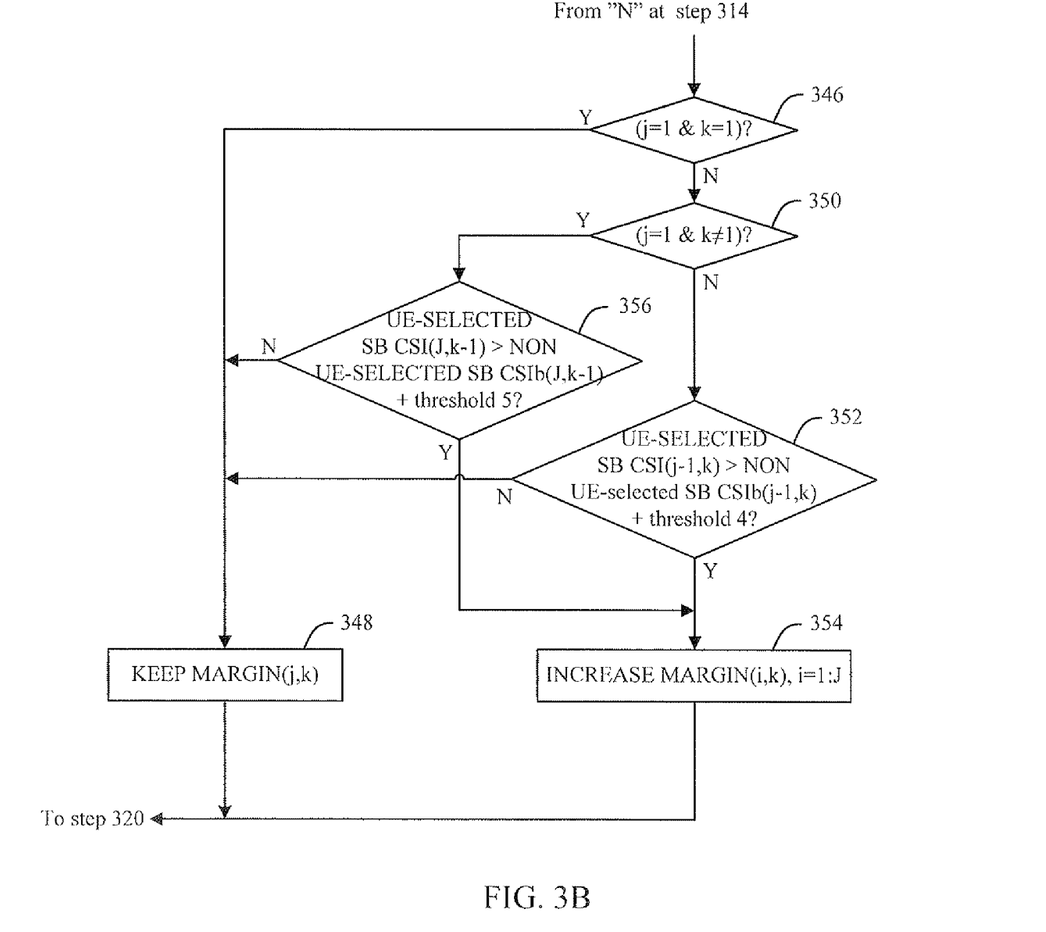
FIG. 3B illustrates a flow-chart of method steps according to alternative embodiments of the present invention.

With reference to method steps in the flowchart as illustrated in FIG. 3B, step 344 will be described.

Starting from the outset when having (j,k)=(1,1) and having a negative answer in step 314 in FIG. 3A, the following step is step 346 of FIG. 3B of determining whether j=1 and k=1, or not. From the outset (j,k)=(1,1) for which reason the following step is keeping the value of MARGIN(1,1) in step 348. Thereafter non UE-selected SB CSIa(i,k), i=1:J, is calculated in step 320 of FIG. 3A as described above.

In case step 314 of FIG. 3A is found negative for (j,k)=(2, 1), the next is step 346 in FIG. 3B, determining whether j=1 and k=1, or not. Since j=2 this step is negative, for which reason it is determined in step 350 whether j=1 and k≠1, or not. Since j=2, step 350 is negative, leading to step 352, wherein UE-selected SB CSI(j−1,k) is compared to non UE-selected SB CSIb(j−1, k) according to equation 16, $$\text{UE-selected SB CSI}(j-1,k)>\text{non UE-selected SB CSI}b(j-1,k)+\text{threshold 4} \quad \text{(eq. 16)}$$

where j=2 and k=1. It is thus determined whether UE-selected SB CSI(1,1) is larger than non UE-selected SB CSIb(1,1) by the threshold 4.

As it was already determined in step 314 of FIG. 3A for (j,k)=(2,1) that the query of step 314 is negative, which is the reason for reaching step 346 of FIG. 3B in the first place, an affirmative step 352 can be considered to be a clear indication of increasing UE-selected SB CSI reports. For this reason the following step is step 354 of increasing the value of MARGIN (i,k), i=1:J. Accordingly, the value of MARGIN(1,1), MARGIN(2,1) and MARGIN(3,1) are increased, since J=3, within this continued example.

If however, step 352 is negative the following step is step 348 of keeping the value of MARGIN(j,k) for (j,k)=(2,1).

Generally speaking, unless the received UE-selected SB CSI is sufficiently large it may not form basis for determining a non UE-selected SB CSIa(j,k) by increasing a non UE-selected SB CSIb(j,k).

Hereafter, non UE-selected SB CSIa(i,k), i=1:J, are calculated according to step 320 of FIG. 3A as earlier described.

If it is, for instance, determined for (j,k)=(1,2) that step 314 is negative, which means that a UE-selected SB CSI(1,2) is not smaller by the threshold 1 than non UE-selected SB CSIb(1,2), the following step is step 346 of determining whether j=1 and k=1, or not. Since j=1 and k=2, step 346 is negative and step 350 of determining whether j=1 and k≠1, or not is positive.

The next step is then to compare UE-selected SB CSI(J,k− 1) and non UE-selected SB CSI(J,k−1) in step 356. The base station thus determines whether equation 17 is affirmative or negative, wherein equation 17 is $$\text{UE-selected SB CSI}(J,k-1)>\text{non UE-selected SB CSI}b(J,k-1)+\text{threshold 5} \quad \text{(eq. 17)}$$

In the case equation is affirmative, which roughly speaking means that UE-selected SB CSI for the last bandwidth part in the former cycle was strong, the next step is step 354 of increasing the value of MARGIN(i,k), i=1:J. In this way the value of MARGIN(1,2), MARGIN(2,2) and MARGIN(3,2) is increased.

In the case equation 17 is negative, the following step is to keep the value of MARGIN(1,2) in step 348.

Again, up to date determinations of CSI values for non UE-selected SB for all bandwidth parts is determined, in step 320 of determining non UE-selected SB CSIa(i,k), i=1:J, as illustrated in FIG. 3A and as already mentioned a few times above.

It should be mentioned that the degree of updating the value of MARGIN(j,k) at cycle k, may be a function of the received WB CSI, and the value of MARGIN (j,k−1) and a recently received UE-selected SB CSI. According to some embodiments of the present invention the adjustment is linearly proportional to the difference between UE-selected SB CSI and the received WB CSI.

Figure 4:
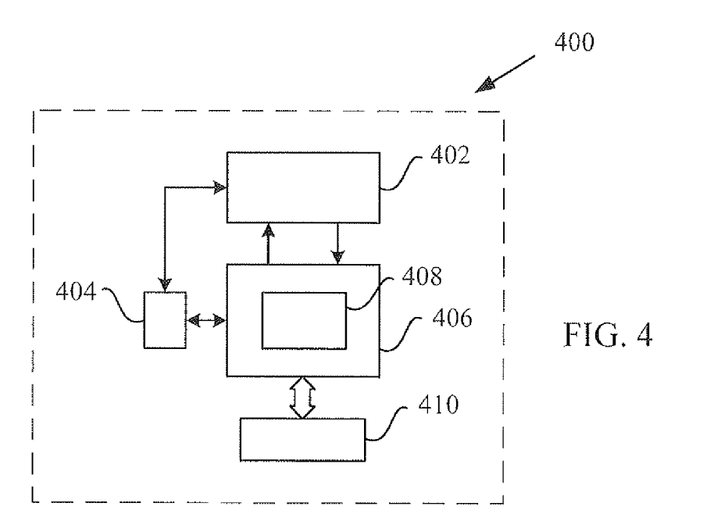
FIG. 4 illustrates a schematic representation of a base station according to some embodiments of the present invention.

With reference to FIG. 4, a base station 400 configured to predict a frequency dependent Channel State Information (CSI), for scheduling and link adaptation of resource blocks of an operating bandwidth, is now presented.

The base station 400 comprises a transceiving unit 402 that is configured to receive a wideband CSI from the UE, and to receive UE-selected subband CSI from a UE. The base station 400 further comprises a processing unit 404 operatively connected to the transceiving unit 402, and configured to obtain a bandwidth part related CSI parameter, to determine an estimate of CSI for non UE-selected subbands from the received wideband CSI and the obtained bandwidth part related CSI parameter. The processing unit 404 is further configured to determine a difference between the UE-selected subband CSI and the estimated CSI for non UE-selected subbands. Said base station 400 further comprises an updating unit 406 operatively connected to the processing unit 404 and to the transceiving unit 402. The updating unit 406 is configured to update the estimate of CSI for non-selected subbands, based on said determined difference between the UE-selected subband CSI and the estimated CSI for non UE-selected subbands. The base station 400 may further comprise a control unit 410 configured to control and police the steps of the transceiving unit 402, the processing unit 404 and the updating unit 406.

The updating unit 406 of the base station 400 may further comprise a triggering unit 408 that is configured to trigger the updating unit 406 to update estimates of non UE-selected SB CSI values, based on determined difference between the UE-selected SB CSI and the estimated CSI for non UE-selected subbands, as obtained from the processing unit 402.

It is briefly noted that the processing unit 404 can thus perform steps 312 of determining an estimate of non UE-selected SB CSI, and steps 314, 328, 328, 352, 356 of determining the differences between the respective UE-selected SB CSI and appropriate non UE-selected SB CSI values. Furthermore, the updating unit is configured to perform the updating steps 318, 320, 332, 342, 348, 354.

According to some embodiments of the present invention, the speed with which a UE can be moving may form a basis for updating an estimate of a non UE-selected SB CSI value for one or more bandwidth parts.

It is explicitly stated that the above features and/or aspects of embodiments of the invention may be combined in several different embodiments or in one singular embodiment.

According to some embodiments of the present invention, the processing unit and the updating unit can be realized by a scheduler of the base station. The function of the triggering unit can alternatively be performed by updating unit or the processing unit, which again may be realized by the scheduler of the base station.

It must also be emphasized that the present invention can be varied in many ways. The presented embodiments of the present invention are only a few examples of the variety of embodiments that are comprised within the present invention.

According to some embodiments of the present invention, the mentioned CSI threshold parameters, threshold 1 to 5, may all have different values, or alternatively, two or more CSI threshold parameters have the same value.

Among the advantages of at least some of the embodiments of the present invention the following can be mentioned:

The risk of high BLER and unnecessary retransmission caused by out-dated CSI, can be reduced, when the SINR is descending.

By decreasing the value of the CSI MARGIN parameter for channels that are not updated recently and are likely to experience a decreasing SINR, embodiments of the present invention reduce the probability for said channels to be scheduled to avoid transmission error, when channel dependent scheduling is used. This is because lower CSI leads to lower probability of being scheduled when using channel dependent scheduling.

In addition, a more conservative link adaptation for these channels would result if they were still scheduled. As a by-product, UEs with updated CSI have a better chance to be scheduled, and their link adaptation is more accurate for these UEs.

The link adaptation can also catch up with the increasing SINR by increasing non UE-selected SB CSI values, if evidence hints that the SINR of the corresponding channels increases, enabling an improved system throughput performance.

The invention claimed is:

1. A method in a base station for predicting a frequency dependent Channel State Information, CSI, value for scheduling and link adaptation of resource blocks of an operating bandwidth comprising a number of bandwidth parts, based on frequency band CSI information related to a user equipment node, UE, the method comprising the steps of:
   receiving a first CSI from the UE, wherein the first CSI is a wideband CSI related to the UE,
   receiving a second CSI from the UE, wherein the second CSI is a UE-selected subband CSI,
   obtaining a bandwidth part related CSI parameter,
   determining a third CSI, wherein the third CSI is an estimate of CSI for a non UE-selected subband based on the received first CSI and the obtained bandwidth part related CSI parameter,
   using the third CSI as a basis for link adaptation for the non UE-selected subband,
   determining a difference between the second CSI and the third CSI,
   determining a fourth CSI, wherein the fourth CSI is an updated estimate of CSI for the non UE-selected subband based on said determined difference between the second CSI and the third CSI, and
   using the fourth CSI, instead of the third CSI, as a basis for link adaptation for the non UE-selected subband.

2. The method according to claim 1, wherein determining the fourth CSI comprises updating the bandwidth part related CSI parameter based on the determined difference between the second CSI and the third CSI.

3. The method according to claim 1, wherein:
   the UE-selected subband CSI corresponds to a UE-selected subband within a first bandwidth part, the bandwidth part related CSI parameter comprises a CSI margin value for the first bandwidth part, the non UE-selected subband is a non-UE-selected subband within the first bandwidth part, determining the third CSI comprises determining an estimate of CSI for the non UE-selected subband within the first bandwidth part based on the first CSI and the obtained CSI margin value for the first bandwidth part, and determining the fourth CSI comprises updating the estimate of CSI for the non UE-selected subband within the first bandwidth part by updating the CSI margin value for the first bandwidth part, based on the determined difference between the second CSI and the third CSI.

4. The method according to claim 3, wherein determining a difference comprises calculating the difference between the third CSI minus the second CSI.

5. The method according to claim 4, wherein determining the fourth CSI comprises decreasing the CSI margin value for the first bandwidth part in response to the calculated difference being larger than a CSI threshold.

6. The method according to claim 3, further comprising:
receiving a fifth CSI from the UE, wherein the fifth CSI is a UE-selected subband CSI corresponding to a UE-selected subband within a second bandwidth part;
obtaining comprises obtaining a CSI margin value for the second bandwidth part;
determining a sixth CSI, wherein the sixth CSI is an estimate of CSI for a non UE-selected subband within the second bandwidth part based on the first CSI and the obtained CSI margin value for the second bandwidth part;
determining a difference between the fifth CSI and the sixth CSI; and
determining a seventh CSI, wherein the seventh CSI is an updated estimate of CSI for the non UE-selected subband within the second bandwidth part determined by updating the CSI margin value for the second bandwidth part, based on the determined difference between the fifth CSI and the sixth CSI and the determined difference between the second CSI and the third CSI.

7. The method according to claim 6, further comprising updating estimates of CSI for non UE-selected subbands within two or more bandwidth parts by updating CSI margin values for the two or more bandwidth parts, based on the determined difference between the fifth CSI and the sixth CSI and the determined difference between the second CSI and the third CSI.

8. The method according to claim 7,
wherein determining the difference between the fifth CSI and the sixth CSI comprises calculating the difference between the sixth CSI minus the fifth CSI, and
wherein determining the difference between the second CSI and the third CSI comprises calculating the difference between the third CSI minus the second CSI.

9. The method according to claim 8, wherein determining the seventh CSI comprises decreasing the CSI margin value for the second bandwidth part in response to the calculated difference between the fifth CSI and the sixth CSI being larger than a second CSI threshold and the calculated difference between the second CSI and the third CSI being larger than a first CSI threshold.

10. A base station configured to predict a frequency dependent Channel State Information, CSI, value for scheduling and link adaptation of resource blocks of an operating bandwidth, comprising at least one bandwidth part, based on frequency band CSI information related to a user equipment node, UE, the base station comprising:
a transceiving unit configured to receive a wideband CSI from the UE, and to receive UE-selected subband CSI from the UE,
a processing unit operatively connected to the transceiving unit, and configured to obtain a bandwidth part related CSI parameter, to determine an estimate of CSI for non UE-selected subbands from the received wideband CSI and the obtained bandwidth part related CSI parameter, to set the estimate of CSI for non UE-selected subbands as the CSI used for link adaptation for the non UE-selected subbands, and to determine a difference between the UE-selected subband CSI and the estimated CSI for non UE-selected subbands, and
an updating unit operatively connected to the processing unit and configured to update the estimate of CSI for non-selected subbands, based on said determined difference between the UE-selected subband CSI and the estimated CSI for non UE-selected subbands and to set the updated estimate of CSI for non UE-selected subbands as the CSI used for link adaptation for the non UE-selected subbands.

11. The base station according to claim 10, wherein the updating unit further comprises a triggering unit that is configured to respond to said determined difference between the UE-selected subband CSI and the estimated CSI for non UE-selected subbands by triggering the updating unit to update the estimate of CSI for non-selected subbands.

12. The base station according to claim 10, wherein:
the transceiving unit further is configured to receive a UE-selected subband CSI for a first bandwidth part,
the processing unit further is configured:
to obtain a CSI margin value parameter for the first bandwidth part,
to determine an estimate of CSI for non UE-selected subbands for the first bandwidth part, from the obtained wideband CSI and the obtained CSI margin value parameter for the first bandwidth part,
to set the estimate of CSI for non UE-selected subbands for the first bandwidth part as the CSI used for link adaptation for the non UE-selected subbands for the first bandwidth part, and
to calculate the difference of the estimated CSI for non UE-selected subbands for the first bandwidth part minus the UE-selected subband CSI for the first bandwidth part, and
the triggering unit is configured to respond to the calculated difference by triggering the updating unit to update the estimate of CSI for non UE-selected subbands within the first bandwidth part by updating the CSI margin value for the first bandwidth part and to set the updated estimate of CSI for non UE-selected subbands for the first bandwidth part as the CSI used for link adaptation for the non UE-selected subbands for the first bandwidth part.

13. The base station according to claim 12, wherein the updating unit further is configured to decrease the CSI margin value parameter for the first bandwidth part in response to the calculated difference being larger than a CSI threshold.

14. The base station according to claim 12, wherein:
the transceiving unit further is configured to receive a UE-selected subband CSI for at least a second bandwidth part,
the processing unit further is configured:
to obtain a CSI margin value parameter for the second bandwidth part, to determine an estimate of CSI for non UE-selected subbands for the second bandwidth part from the obtained wideband CSI and the obtained CSI margin value parameter for the second bandwidth part, to set the estimate of CSI for non UE-selected subbands for the second bandwidth part as the CSI used for link adaptation for the non UE-selected subbands for the second bandwidth part, to determine a difference between the UE-selected subband CSI for the second bandwidth part and the estimated CSI for non UE-selected subbands for the second bandwidth part, the triggering unit further is configured to trigger, based on the determined difference between the UE-selected subband CSI for the second bandwidth part and the estimated CSI for non UE-selected subbands for the second bandwidth part, and the determined difference between the UE-selected subband CSI for the first bandwidth part and the estimated CSI for non UE-selected subbands for the first bandwidth part, the updating unit to update the estimate of CSI for non UE-selected subbands within the second bandwidth part by updating the CSI margin value for the second bandwidth part and to set the updated estimate of CSI for non UE-selected subbands for the second bandwidth part as the CSI used for link adaptation for the non UE-selected subbands for the second bandwidth part.

15. The base station according to claim 14, wherein the triggering unit further is configured to trigger, based on the determined difference between the UE-selected subband CSI for the second bandwidth part and the estimated CSI for non UE-selected subbands for the second bandwidth part and the determined difference between the UE-selected subband CSI for the first bandwidth part and the estimated CSI for non UE-selected subbands for the first bandwidth part, the updating unit to update the estimate of CSI for non UE-selected subband for two or more bandwidth parts, by updating CSI margin value for said two or more bandwidth parts.

16. The base station according to claim 15, wherein the processing unit further is configured:
   to determine a second bandwidth part related difference by calculating the difference of the estimated CSI for non UE-selected subbands for the second bandwidth part minus the UE-selected subband CSI for the second bandwidth part and
   to determine a first bandwidth part related difference by calculating the difference of the estimated CSI for non UE-selected subbands for the first bandwidth part minus the UE-selected subband CSI for the first bandwidth part.

17. The base station according to claim 16, wherein the triggering unit further is configured to trigger the updating unit to decrease the CSI margin value for the second bandwidth part, in response to the calculated second bandwidth part related difference being larger than a second CSI threshold and the calculated first bandwidth part related difference being larger than a first CSI threshold.

* * * * *